(12) United States Patent
Downs et al.

(10) Patent No.: US 10,052,575 B2
(45) Date of Patent: Aug. 21, 2018

(54) FILTER ELEMENT

(71) Applicant: CLARCOR ENGINE MOBILE SOLUTIONS, LLC, Franklin, TN (US)

(72) Inventors: Kevin Bidwell Downs, Coventry, CT (US); Nicholas Robert Peterson, Ellington, CT (US)

(73) Assignee: Clarcor Engine Mobile Solutions, LLC, Franklin, TN (US)

( * ) Notice: Subject to any disclaimer, the term of this patent is extended or adjusted under 35 U.S.C. 154(b) by 1171 days.

(21) Appl. No.: 14/247,551

(22) Filed: Apr. 8, 2014

(65) Prior Publication Data
US 2014/0305858 A1   Oct. 16, 2014

Related U.S. Application Data

(60) Provisional application No. 61/810,307, filed on Apr. 10, 2013.

(51) Int. Cl.
| B01D 27/00 | (2006.01) |
| B01D 35/00 | (2006.01) |
| B01D 29/21 | (2006.01) |
| B01D 29/96 | (2006.01) |
| B01D 17/02 | (2006.01) |

(52) U.S. Cl.
CPC .......... *B01D 35/005* (2013.01); *B01D 29/21* (2013.01); *B01D 29/96* (2013.01); *B01D 17/0214* (2013.01); *B01D 2201/295* (2013.01); *B01D 2201/4007* (2013.01); *B01D 2201/4015* (2013.01); *B01D 2201/4046* (2013.01); *B01D 2201/4053* (2013.01); *B01D 2201/4076* (2013.01)

(58) Field of Classification Search
CPC ...... B01D 35/005; B01D 29/96; B01D 29/21; B01D 2201/4053; B01D 2201/4015; B01D 2201/295; B01D 2201/4076; B01D 2201/4046; B01D 17/0214
See application file for complete search history.

(56) References Cited

U.S. PATENT DOCUMENTS

| 4,619,764 A | 10/1986 | Church et al. |
| 5,753,120 A * | 5/1998 | Clausen ................. B01D 29/21 |
| | | 210/438 |

(Continued)

OTHER PUBLICATIONS

European Search Report dated Jul. 28, 2014 (EP 14164036).

*Primary Examiner* — Dung H Bui
(74) *Attorney, Agent, or Firm* — Alix, Yale & Ristas, LLP (57) ABSTRACT

A filter element has a first end cap and a ring of filter media. The first end cap includes structures projecting from the periphery to form a keyed connection with a filter bowl and filter head. Some of the projections are fixed lugs, while other projections are latch fingers arranged to move in an axial direction during mounting and dismounting of the filter assembly components. The filter element first end cap is configured to mate with the upper end of a filter bowl to form an element/bowl assembly. The mated structures of the element and bowl form the male part of a bayonet connection. The filter head defines a corresponding female bayonet connector part. The latch fingers retain the element to the bowl and the assembled element and bowl to the filter head.

20 Claims, 7 Drawing Sheets

(56) References Cited

U.S. PATENT DOCUMENTS

| | | | |
|---|---|---|---|
| 6,015,492 A * | 1/2000 | Popoff | B01D 27/07 210/238 |
| 6,416,563 B1 † | 7/2002 | Wright | |
| 8,057,669 B2 † | 11/2011 | Beard | |
| 8,167,966 B2 | 5/2012 | Amirkhanian et al. | |
| 8,268,170 B2 | 9/2012 | Core et al. | |
| 9,199,187 B2 | 12/2015 | Honermann et al. | |
| 9,517,426 B2 * | 12/2016 | Pascale Neto | B01D 29/11 |
| 2002/0158006 A1 * | 10/2002 | Thomas | B01D 29/21 210/440 |
| 2003/0226800 A1 * | 12/2003 | Brown | B01D 29/15 210/497.01 |
| 2005/0000886 A1 * | 1/2005 | Reynolds | B01D 29/21 210/450 |
| 2006/0180539 A1 | 8/2006 | Wolf et al. | |
| 2006/0186031 A1 * | 8/2006 | Fick | B01D 29/118 210/235 |
| 2007/0267338 A1 * | 11/2007 | Menez | B01D 29/21 210/435 |
| 2007/0271884 A1 * | 11/2007 | Pearson | B01D 46/0012 55/410 |
| 2008/0142425 A1 | 6/2008 | Hansen | |
| 2008/0245719 A1 * | 10/2008 | Beard | B01D 29/114 210/235 |
| 2010/0155321 A1 * | 6/2010 | Sasur | B01D 29/21 210/232 |
| 2011/0049035 A1 | 3/2011 | Wise et al. | |
| 2011/0147297 A1 * | 6/2011 | Core | B01D 29/21 210/232 |
| 2014/0183118 A1 * | 7/2014 | Marks | B01D 35/14 210/236 |
| 2014/0305858 A1 * | 10/2014 | Downs | B01D 29/21 210/232 |

\* cited by examiner
† cited by third party

FILTER ELEMENT

CROSS-REFERENCE TO RELATED APPLICATION

This application claims the priority of U.S. Provisional Application No. 61/810,307, filed on Apr. 10, 2013 entitled "Filter Element," the entire disclosure of which is incorporated herein by reference in its entirety.

BACKGROUND OF THE DISCLOSURE

The present disclosure relates to filters, and more particularly, to a filter element for use in a fuel supply system for a motor vehicle.

Significant quantities of contaminants such as water and assorted abrasive particles may be found in fuel. To remove contaminants and prevent damage to sensitive engine components, fuel supply systems may include one or more filter assemblies configured to remove water and contaminants from the fuel supply. Traditional fuel supply systems may include a removable filter element between a filter bowl and filter header to form a filter assembly defining a fuel flow path routing fuel through filter media supported by the filter element before the fuel is delivered to sensitive engine systems. The filter bowl and filter header are configured so that the filter element may be replaced according to maintenance schedules or as needed.

Traditional fuel filters may utilize any of a variety of configurations to retain a filter element within a filter assembly. For example, the filter bowl may have generally cylindrical shell which defines an open end for receiving the filter element. The filter bowl and filter header may comprise mateable parts of a threaded or a bayonet connector system to retain the bowl to the header. Connections between a filter bowl and filter header are required to withstand vibration, shock and relatively high internal pressure, while accommodating an increasing volume of fuel which may flow through modern fuel supply systems.

The filter bowl and filter header may also have a keyed mating system. In a traditional keyed mating system, any or all of the components of the filter assembly may have detents, tabs or other structural components arranged in any of a plurality of specific configurations. If any of the components does not include complementary structures, the keyed mating system is configured so it will not properly mate. Keyed systems ensure the correct components are used to form filter assemblies having specified filtration, pressure and flow characteristics.

There is a need in the art for a filter element that cooperates with a filter assembly to provide a robust, keyed connection between a filter bowl and filter header.

SUMMARY

A filter element in accordance with aspects of the present disclosure generally has a filter axis and comprises a first end cap coaxial with the filter axis, and a ring of filter media secured to the first end cap. The first end cap defines fluid openings coaxial with the filter axis and includes structures projecting from the periphery of the first end cap to engage complementary structures on the filter bowl and filter head.

A filter element having a central axis comprises a first end cap defining a fluid flow opening coaxial with the central axis. The first end cap has first and second surfaces extending radially outward from said opening to an annulus a first radial distance from said opening. The annulus projects from a second surface of the first end cap to define a seat for the upper end of a cylindrical filter media. The first end cap includes an interrupted ring radially outward of the annulus and defines at least one fluid flow opening between the first and second surfaces radially intermediate the annulus and the ring.

A generally cylindrical filter media is secured to the second surface of said first end cap and extends axially away from said first end cap. The filter media has an outside circumference adjacent said annulus. A plurality of fixed position lugs radially extend from said ring and extend along the circumference of the first end cap. Each lug has a leading end and a trailing end, with the trailing end defining a notch. A plurality of first latch fingers project radially from a root adjacent said annulus to a free end including a first catch facing axially away from said upper end cap second surface and toward said first end cap first surface. Each of said latch fingers extending radially through and interrupting said ring so that said catch is axially movable relative to and extends radially beyond said ring.

The periphery of the first end cap also includes at least one second latch finger intermediate one of said plurality of said first latch fingers and one of said lugs. The second latch finger is separated from the laterally adjacent first latch finger and lug by notches extending through said ring so that the second latch finger is axially movable relative to and extends beyond said ring. The second latch finger including a second catch at a free end thereof, the second catch facing axially away from said first end cap first surface and toward said first end cap second surface.

BRIEF DESCRIPTION OF THE DRAWING

Aspects of the preferred embodiment will be described in reference to the Drawings, where like numerals refer to like elements.

DETAILED DESCRIPTION

With reference to the drawing wherein like numerals represent similar parts throughout the several figures, a filter element is generally designated by the reference numeral 100. The filter element 100 is configured for use with a keyed filter assembly 200 partly shown in FIGS. 9-11, which will be described in detail below.

With reference to FIGS. 1-6, the filter element 100 comprises a first end cap 102 coaxial with a filter axis A-A. A ring of filter media 103 extends between the first end cap 102 and an opposing second end cap 101. The filter media 103 is chosen from a suitably permeable, typically nonwoven fibrous material such as reinforced cellulose paper and attached in fluid tight relationship to the first and second end caps, 102 and 101, such that fluid circulated through the filter assembly 200 (see FIGS. 9-10), necessarily passes through the filter media 103. In the disclosed filter element 100, the second end cap 101 is integrated with a center tube 105 that defines a fuel inlet 107 and separates fuel entering the filter assembly 200 from clean fuel that has passed through the filter media 103.

The first end cap 102 has a first (upper) surface 104 and a second (lower) surface 111. The first surface 104 extends between coaxial fluid flow openings 106, 107 substantially centered on the filter axis A-A. The upper end cap 102 includes an annulus 108 projecting from the second surface 111 and surrounding the outer circumference of the upper end of the filter media 103. Radially beyond the annulus 108, the first end cap 102 includes an interrupted ring 109. The first end cap 102 defines a plurality of fluid flow apertures 110 radially intermediate the annulus 108 and the interrupted ring 109. Fuel enters the filter assembly 200 through fluid inlet 107 and fills the bottom area of the filter bowl 202 (not shown). The fluid flow apertures 110 are configured to allow fluid to pass through the first end cap 102 and fill the area within the filter assembly 200 above the first end cap 102, thereby displacing any air or gas that may be present in the filter assembly 200. Fluid passing through the filter media 103 is routed out of the filter assembly through fluid outlet 106. The structural configuration of the fluid outlet 106, inlet 107 and position of the fluid flow apertures 110 on the first end cap 102 may be altered according to the preferred fluid flow path through the filter assembly 200.

The first (upper) end cap 102 of the filter element 100 is configured to have a single installed orientation with respect to the filter bowl 202 and filter head 204, while forming part of a bayonet coupling that joins the bowl 202 to the head 204. Features arranged on the periphery of the first end cap 102 mate with complementary structures on the filter bowl 202 and filter head 204 to form keyed connections defining a single installed position for the filter element 100 within the filter assembly 200, as discussed stepwise below. The first end cap 102 also includes radially extending features that form part of a bayonet connection securing the assembled filter element 100 and filter bowl 202 to the filter head 204.

In a disclosed embodiment, the first end cap 102 includes three fixed lugs 112 extending from the interrupted ring 109 at circumferentially spaced positions. In the embodiment shown in FIGS. 1-6, the lugs 112 are not equiangularly spaced from each other, as shown best in FIGS. 1 and 3. The arrangement of lugs 112 and other features on the filter assembly components can be selected to form a unique keyed configuration to distinguish components compatible with a particular filter assembly from non-compatible components. Each lug 112 has a shape complementary with features of the filter bowl 202 and the filter head 204 and forms part of a bayonet connection securing the bowl 202 to the head 204, as shown in FIGS. 7-11.

Figure 9:
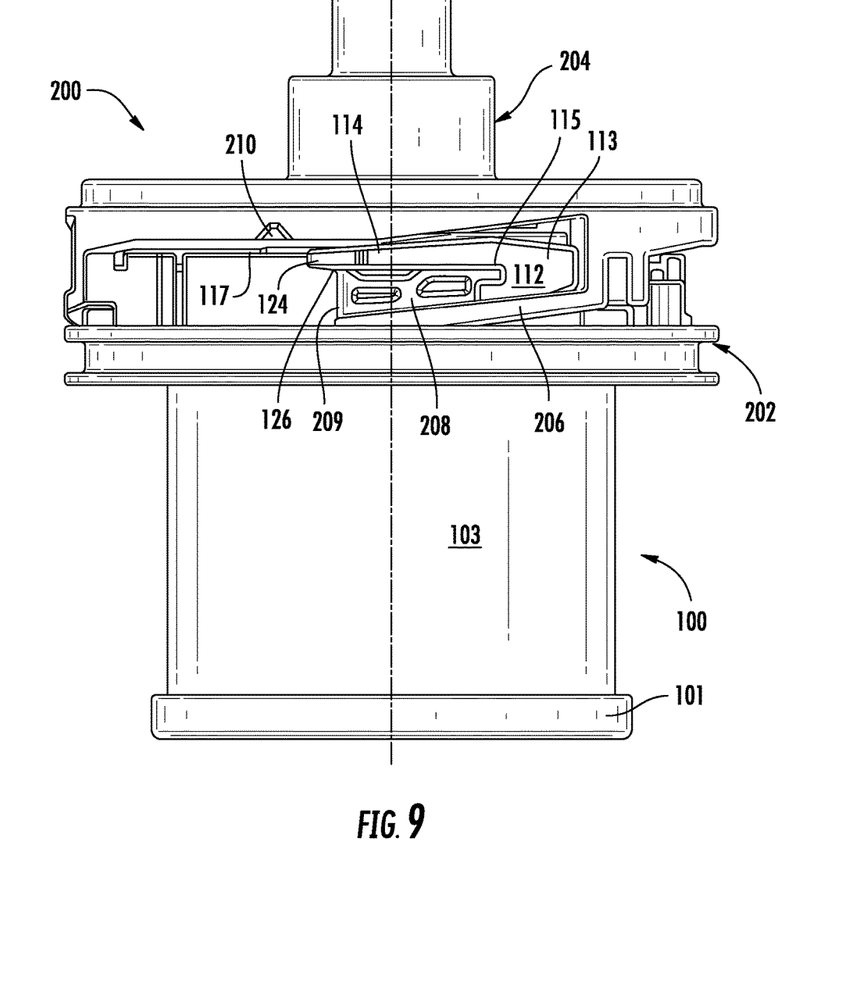
FIG. 9 is a side elevation view of a filter element according to the disclosure in functional conjunction with a bowl (with side walls and bottom portion of bowl omitted for clarity) of FIG. 8 and header component.
Figure 10:
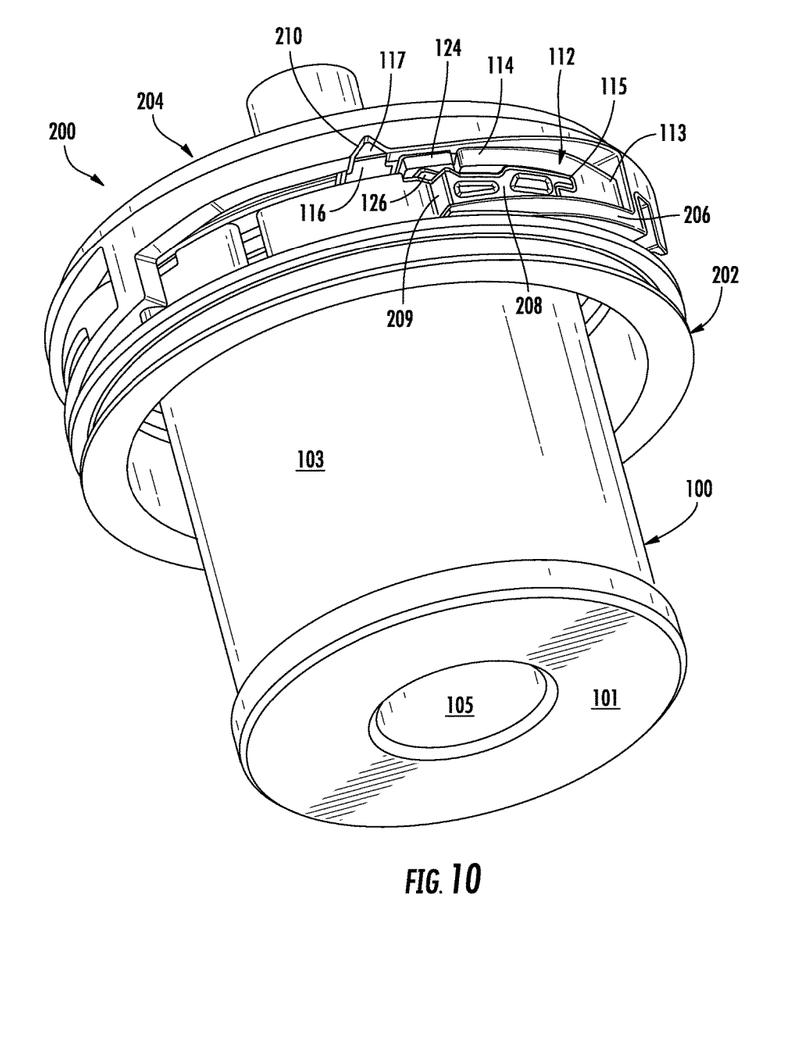
FIG. 10 is a bottom perspective view of the filter element, bowl and header component of FIG. 9.
Figure 11:
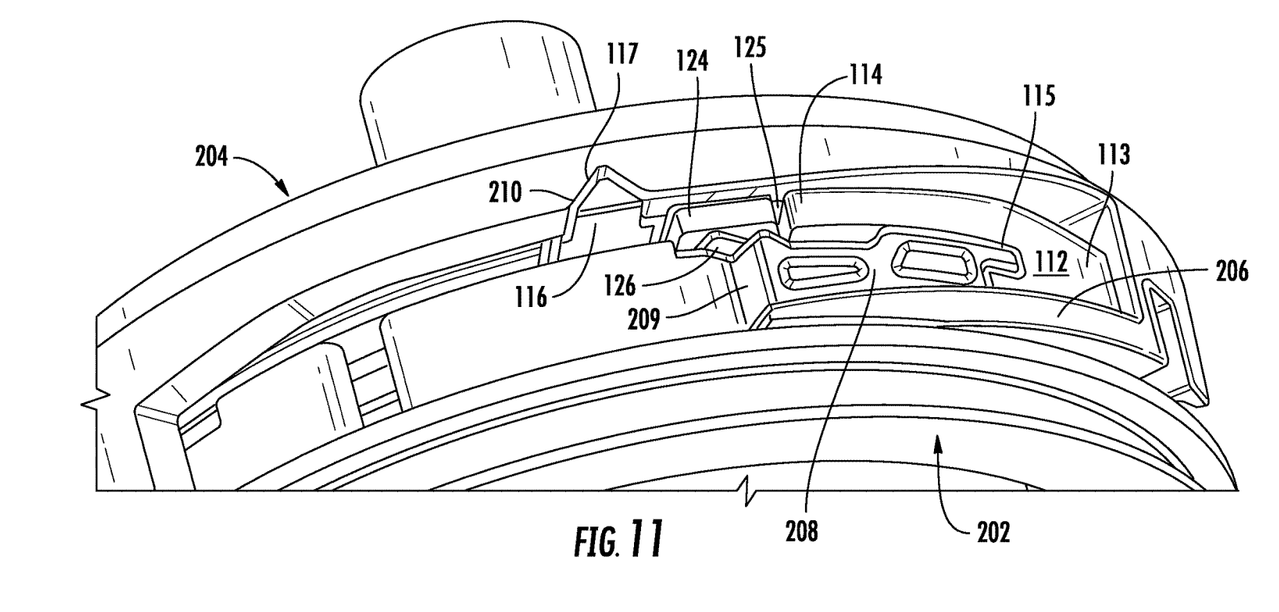
FIG. 11 is an enlarged portion of FIG. 10, showing details of the connection between the bowl, filter element and header component.

A leading end 113 of each lug 112 has a connector arm with a tapered configuration complementary to a corresponding ramp 206 on the filter head 204, as shown in FIGS. 9-11. As shown, the connector arm and lug 112 define a circumferential notch 115 from the trailing end 114. The notch 115 is complementary to a boss 208 radially projecting from the upper rim of the filter bowl 202. As best seen in FIGS. 9-11, the mated lug 112 and boss 208 cooperate to form a male bayonet element complementary to a female bayonet element of a bayonet connection defined by slots and ramps 206 the filter head 204.

The first end cap includes locking latch fingers 116 projecting radially from a root 115 adjacent the annulus 108 to a free end including a catch 117. The disclosed catch 117 defines a wedge with an edge extending radially and projecting away from the first end cap second (bottom) surface 111, and in the direction of the first end cap first surface 104. As shown, each latch finger 116 extends radially through the interrupted ring 109. Radially oriented slots 118 separate the latch fingers 116 from adjacent structure, allowing the latch fingers 116 to flex relative to the first and second surfaces, 104 and 111, and thereby move axially relative to the lugs 112 and interrupted ring 109. With reference to the view of FIG. 1, it can be said that the latch fingers 116 may bend approximately about a line T substantially parallel to a line tangent to the annulus 108 and interrupted ring 109 proximate where the root 115 begins. The bending or pivoting action about line T would necessarily not be a precise rotating hinge due to the inherent deformation/bending of the material from which the first end cap is made.

At least one secondary retention latch finger 124 is arranged substantially parallel with one of the locking latch fingers 116. The secondary latch finger 124 is separated from adjacent structure by the slot 118 of the adjacent latch finger 116 and a radially oriented notch 125 on its opposite side. The secondary latch finger 124 is positioned intermediate one of the lugs 112 and one of the latch fingers 116 and is arranged to flex axially relative to the first and second surfaces, 104 and 111, independent of the adjacent latch finger 116 and lug 112. The secondary latch finger 124 includes a barb 126 facing away from the upper end cap first surface 104 and in the direction of the second surface 111 (i.e., downward in the view of FIG. 2).

Figure 1:
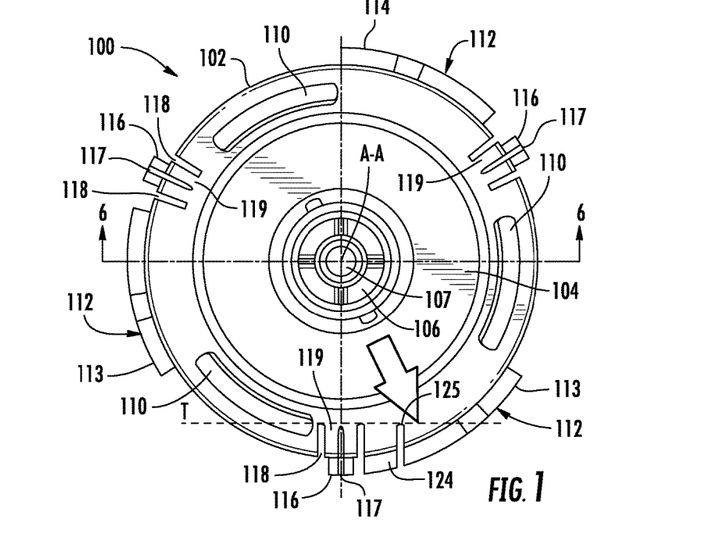
FIG. 1 is a top plan view of a filter element of the present disclosure.
Figure 2:
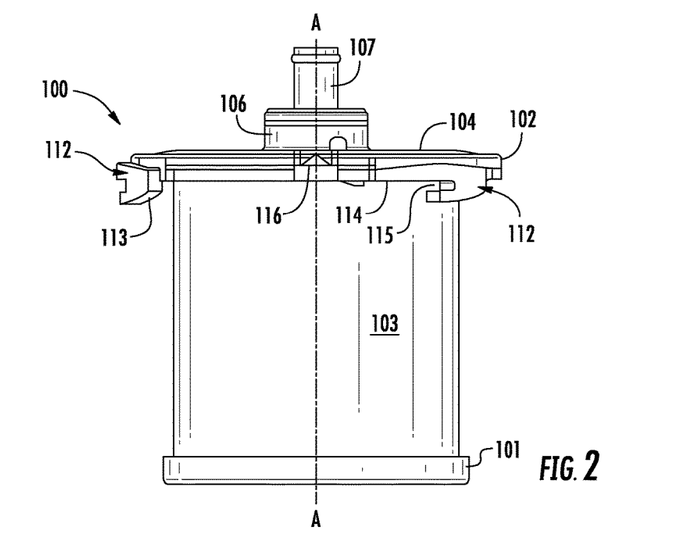
FIG. 2 is a side elevation view of the filter element of FIG. 1.
Figure 3:
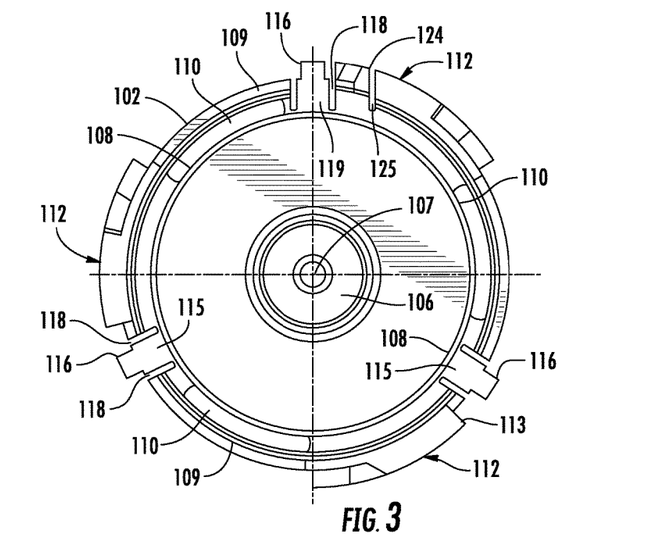
FIG. 3 is a bottom plan view of the first end cap of the filter element of FIG. 1, with the remainder of the filter element omitted for clarity.
Figure 4:
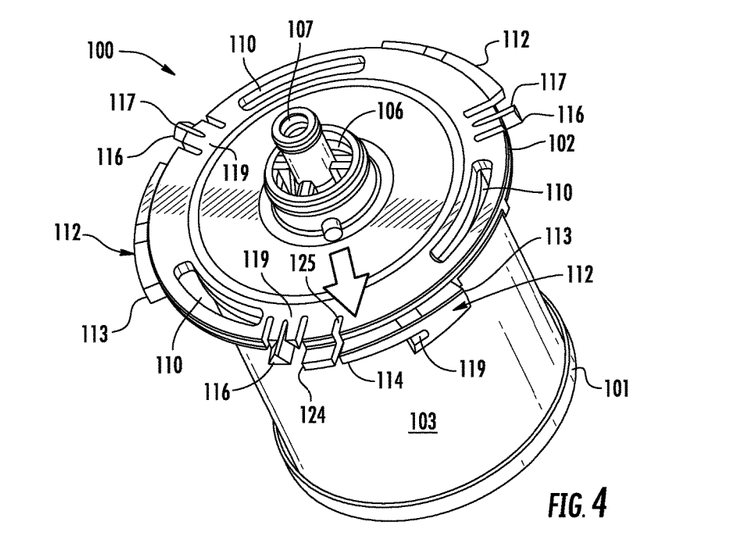
FIG. 4 is a top perspective view of the filter element of FIGS. 1 and 2.
Figure 5:
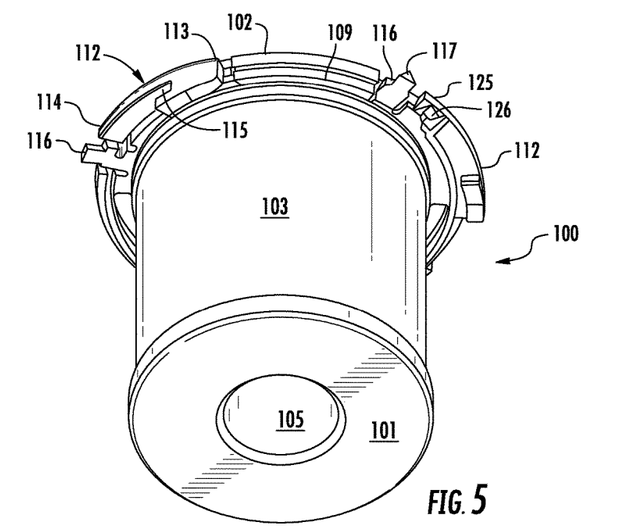
FIG. 5 is a bottom perspective view of the filter element of FIGS. 1, 2, and 4.
Figure 6:
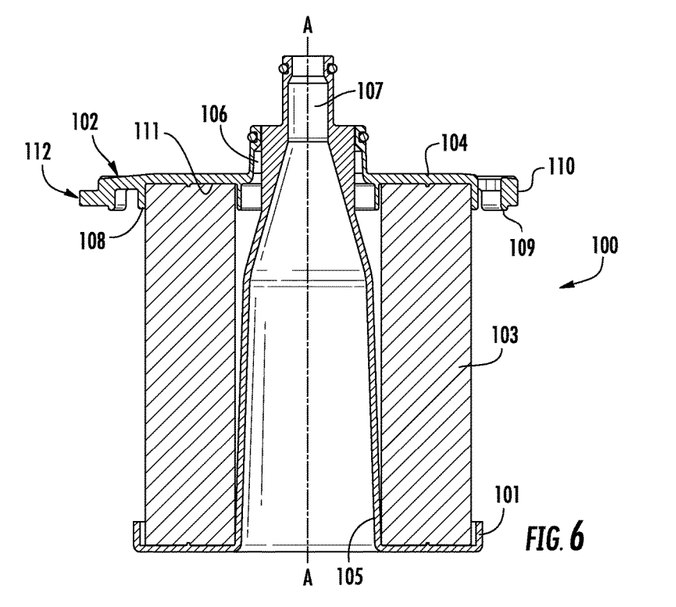
FIG. 6 is a sectional view through the filter element of FIG. 1, taken along line 6-6 thereof.
Figure 7:
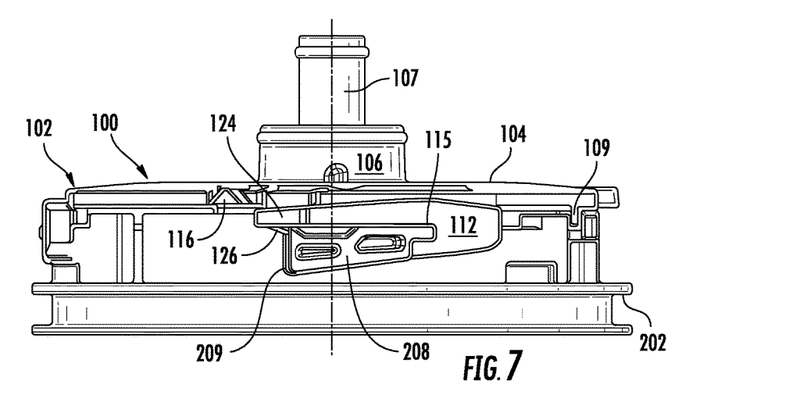
FIG. 7 is a side elevation view of an embodiment of a filter element according to the disclosure in conjunction with a bowl, with side walls and bottom portion of the bowl omitted for clarity.
Figure 8:
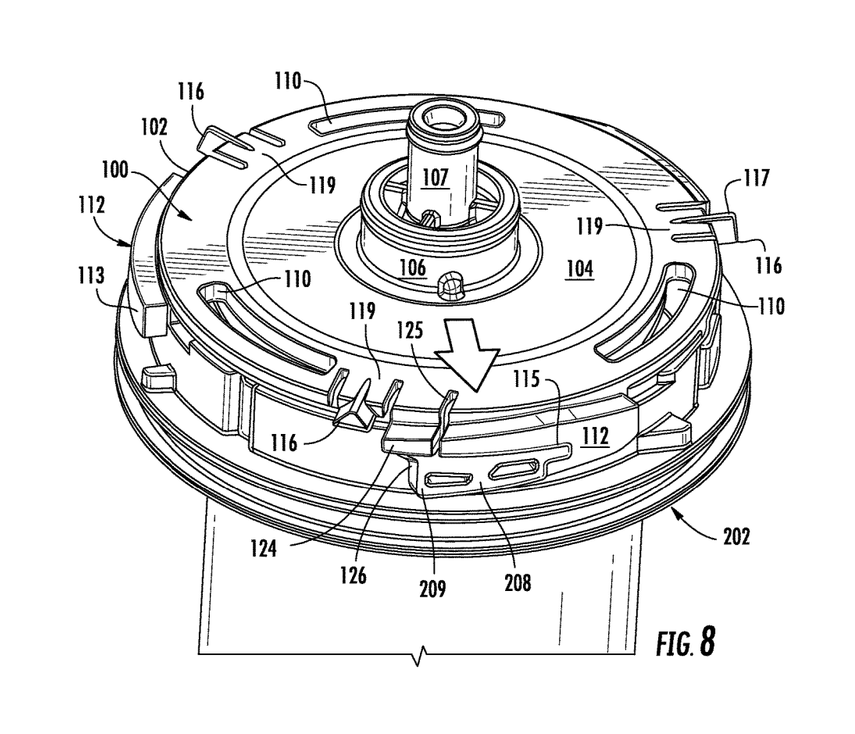
FIG. 8 is a top perspective view of the filter element and bowl of FIG. 7, with side walls and bottom portion of the bowl omitted for clarity.

FIGS. 7 and 8 illustrate a disclosed filter element 100 in functional conjunction with a filter bowl 202. In the disclosed filter assembly 200, the filter element 100 is configured to mate with the filter bowl 202 (as described above), and then the assembled filter element 100 and bowl 202 combination is connected to the filter head 204 to form an assembly 200.

To form the connection between the filter element 100 and the filter bowl 202, the filter element 100 is positioned above the open end of the filter bowl 202 and angularly oriented in a position for axial insertion into the bowl 202 where peripheral projecting structures of the upper end cap 102 (i.e., lugs 112 and primary and secondary latch fingers, 116 and 124) will mate with corresponding elements on the upper end of the filter bowl 202. The bottom end (i.e., second end cap 101) is inserted into the bowl 202 and the lugs 112 are engaged in corresponding notches (not shown) in the upper end of the filter bowl 202. The filter element 100 is then rotated clockwise relative to the bowl 202 so that the bosses 208 of the bowl 202 are received within the notch 115 defined by each lug 112. During rotation of the element 100 relative to the bowl 202, the barb 126 supported by the secondary latch finger 124 flexes axially upwardly to ride over the top surface of the boss 208 until it engages a trailing end 209 of the boss 208 as shown in FIGS. 7-11, thereby rotationally locking the filter element 100 and bowl 202 relative to each other. FIGS. 7 and 8 show the filter element 100 engaged to the filter bowl 202 in the locked position and ready for installation into the filter head 204.

FIGS. 9-11 show the assembled filter element and bowl 100, 202 installed in a disclosed filter head 204. Notably, the entire filter head 204 is not shown, only a component illustrating the structures of a filter head 204 configured to mate with the disclosed filter element 100 and filter bowl 202. The fluid inlet 107 and outlet 106 are received in complementary axial portions of the filter head, where O-ring seals separate incoming dirty fuel from outgoing clean fuel. A filter element 100 and attached filter bowl 202 combination assembly (collectively referred to as reference numeral 100/202) is attached to the filter head 204, first by orienting the assembly 100/202 so the engaged lug 112 and boss 208 are aligned with an axial slot (not shown) defined on the periphery of a bottom opening of the filter head 204. The assembly 100/202 is axially inserted (upward in the views of FIGS. 9-11) into the filter head 204 and then rotated clockwise relative to the filter head 204. During counterclockwise rotation of the assembly 100/202 relative to the filter head 204, the engaged lug 112 and boss 208 ride up a ramp 206 defined by the filter head 204. As the engaged lug 112 and boss 208 approach the top of the ramp 206, the catch 117 on each of the latch fingers 116 engages a corresponding notch 210 defined by the filter head 204. The notch 210 is complementary in shape to the catch 117. During engagement, the latch finger 116 flexes axially downwardly to allow relative rotation of the assembly 100/202 and filter head 204, and then back upwardly into the notch 210 to define the fully installed position of the assembly 100/202 and the filter head 204.

Engagement of the catches 117 with the corresponding notches 210 securely maintains the assembly 100/202 in the installed position until sufficient clockwise torque is applied to axially flex the three latch fingers 116 downwardly to release the assembly 100/202 from the installed position shown in FIGS. 9-11. During the application of clockwise torque to the assembly 100/202 (i.e., removal of the assembly 100/202), the barb 126 maintains the locked connection between the filter element 100 and the filter bowl 202. After the assembly 100/202 is removed from the filter head 204, upward pressure applied to the secondary latch finger 124 pivots the finger upward to release the barb 126 from the trailing end 209 of boss 208, thereby allowing disassembly of the filter element 100 from the filter bowl 202.

The configuration of the upper end cap 102 with circumferentially spaced lugs 112, and spaced primary and secondary latch fingers, 116 and 124, extending radially therefrom has been shown to provide a strong and rigid releasable connection between the operative elements (filter element, filter bowl, and filter head) with improved durability over similar filter elements known in the field.

One of ordinary skill in the art will appreciate that the number and spacing of the lugs 112, bosses 208, latch fingers 116, secondary latch finger 124 and complementary structures may be altered without departing from the scope of the concepts disclosed herein. The configuration and relative position of these structures may be varied to achieve an infinite number of unique keyed relationships between a filter element with peripheral outwardly extending cooperative elements, filter bowl and filter head according to aspects of the disclosure.

One of skill in the art will also realize that the filter element 100 may be provided with as many secondary latch fingers 124 as there are lugs 112 and bosses 208 without departing from the scope of the disclosure. The male and female portions of the disclosed bayonet connection may be configured to permit mounting of the assembly 100/202 in either the clockwise or counter clockwise direction, according to preference.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What we claim is:
1. A filter element having a filter axis comprising:
a first end cap defining a central fuel flow opening coaxial with the filter axis and having a first end cap surface and opposite second end surface extending radially between said opening and a peripheral annulus;
a plurality of connector assemblies comprising a connector lug projecting radially beyond and extending circumferentially along said peripheral annulus between first and second circumferential lug ends, a locking latch finger projecting radially from said peripheral annulus and circumferentially spaced from said connector lug first circumferential end, said locking latch finger being flexible from the peripheral annulus in an axial direction, and a retention finger projecting radially beyond said peripheral annulus intermediate said locking latch finger and said connector lug of at least one connector assembly in said plurality of connector assemblies, said retention finger being circumferentially spaced from each of the locking latch finger and connector lug by opposing radial notches; and
a substantially cylindrical ring of filter media extending substantially coaxial with the filter axis from the first end cap second surface radially beyond the central fuel flow opening.
2. The filter element of claim 1, wherein the retention finger is flexible in the axial direction independent of the latch finger and connector lug.
3. The filter element of claim 1, wherein said filter media is secured to a filter media annular wall disposed circumferentially inwardly of said peripheral edge and projecting from the first end cap second surface, comprising at least one fluid flow aperture extending between the first end cap first and second surfaces intermediate the first end cap peripheral annulus and the filter media annular wall.
4. The filter element of claim 1, wherein a connector arm projects in an axial direction toward a second end cap at a circumferential end of said connector lug opposite said locking latch finger.
5. The filter element of claim 4, wherein the connector arm and lug collectively define a circumferentially extending notch.
6. The filter element of claim 5, wherein the circumferentially extending notch is shaped for receipt of a radially projecting boss in a filter bowl to which said filter element is configured for cooperative releasable engagement.
7. The filter element of claim 4, wherein each connector lug has a first surface and an opposite second surface, the first surface defining a first ramp from its first circumferential end toward the second circumferential end to an apex and a second ramp from the apex to the second circumferential end, and the connector arm projects from the connector lug second surface.

8. The filter element of claim 1, wherein said locking latch finger includes a radially outer portion defining a wedge having an edge extending radially.

9. The filter element of claim 8, wherein the edge of the wedge faces axially in a direction of the first end cap first surface.

10. The filter element of claim 8, wherein a retention finger projects radially beyond said peripheral edge intermediate said locking latch finger and said connector lug of at least one connector assembly in said plurality of connector assemblies and the retention finger includes a barb projecting axially in a direction opposite from the edge of the wedge.

11. The filter element of claim 10, wherein the edge of the wedge faces in a direction toward the first end cap first surface and the retention finger barb projects in the direction toward the first end cap second surface.

12. The filter element of claim 1, wherein said first end cap defines a plurality of circumferentially spaced fluid flow apertures extending between the first surface and the second surface radially intermediate said peripheral annulus and said ring of filter media.

13. The filter element of claim 1, comprising three circumferentially spaced connector assemblies, wherein one connector assembly includes a retention finger.

14. A filter element having a central axis comprising:
a first end cap defining a fluid flow opening coaxial with said central axis, said first end cap having first and second surfaces extending radially beyond said opening to an annulus a first radial distance from said opening, said first end cap comprising an interrupted ring radially beyond said annulus and defining at least one fluid flow opening between said first and second surfaces radially intermediate said annulus and said ring;
a generally cylindrical filter media secured to the second surface of said first end cap and extending axially away from said first end cap, said filter media having an outer circumference adjacent said annulus;
a plurality of fixed position lugs radially extending from said ring;
a plurality of first latch fingers projecting radially from a root adjacent said annulus to a free end including a first catch facing axially away from said first end cap second surface and toward said first end cap first surface, each of said latch fingers extending radially through and interrupting said ring so that said catch is axially movable relative to and extends radially beyond said ring; and
at least one second latch finger intermediate one of said plurality of said first latch fingers and one of said lugs, said second latch finger separated from said one of said first latch fingers and said one of said lugs by radial notches extending through said ring so that said second latch finger is axially movable relative to and extends beyond said ring, said second latch finger including a second catch at a free end thereof, said second catch facing axially away from said first end cap first surface and toward said first end cap second surface.

15. The filter element of claim 14, wherein each lug extends partially circumferentially around the ring from a lug first end to a lug second end.

16. The filter element of claim 15, wherein each first latch finger is circumferentially displaced and spaced from each of said lug first ends.

17. The filter element of claim 16, wherein the at least one second latch finger is positioned circumferentially intermediate and spaced from a lug first end and first latch finger.

18. The filter element of claim 14, wherein the first catch defines a wedge having an edge extending radially and facing axially in the direction of the first end cap first surface.

19. The filter element of claim 14, wherein each lug defines a circumferential notch shaped for receipt of a substantially radially projecting boss in a filter bowl substantially coaxial to the central axis.

20. A filter element having a filter axis comprising:
a first end cap defining a central fuel flow opening coaxial with the filter axis and having a first end cap surface and opposite second end surface extending radially between said opening and a peripheral annulus;
a plurality of connector assemblies comprising a connector lug projecting radially beyond and extending circumferentially along said peripheral annulus between first and second circumferential lug ends, and a locking latch finger projecting radially from said peripheral annulus and circumferentially spaced from said connector lug first circumferential end, said locking latch finger being flexible from the peripheral annulus in an axial direction;
a retention finger projecting radially beyond said peripheral edge intermediate said locking latch finger and said connector lug of at least one connector assembly in said plurality of connector assemblies, said retention finger being circumferentially spaced from each of the locking latch finger and connector lug by opposing radial notches; and
a substantially cylindrical ring of filter media extending substantially coaxial with the filter axis from the first end cap second surface radially beyond the central fuel flow opening.

* * * * *